March 15, 1966     E. S. McVEY     3,241,046
PROGRAMMED PRECISION REGULATOR

Filed Nov. 14, 1962     2 Sheets-Sheet 2

INVENTOR.
EUGENE S. McVEY
BY
Oberlin, Maky & Donnelly
ATTORNEYS

3,241,046
PROGRAMMED PRECISION REGULATOR
Eugene S. McVey, Charlottesville, Va., assignor to Elgin
Electronics Incorporated, a corporation of Ohio
Filed Nov. 14, 1962, Ser. No. 237,583
1 Claim. (Cl. 323—22)

The present invention relates generally as indicated to a programmed precision regulator, and more particularly, to a current regulator that establishes a current in load components in accordance with a program resistor, and also to a voltage regulator for generator control.

Hitherto, programmed regulators operating accurately from the microampere to the ampere region have not been available. Furthermore, known regulators have been unstable when the load is a general impedance unless loop gain is decreased with consequent loss of accuracy.

Accordingly, it is a principal object of this invention to provide a programmed precision regulator that has greater accuracy, and at less expense, than known regulators, while it maintains high loop gain and stability even with loads containing inductance and capacitance.

Another object of this invention is to provide a precision regulator adapted for testing relays, calibrating ammeters, and other allied uses wherein extreme accuracy is necessary.

Another object of this invention is to provide a precision regulator of the character indicated which accurately regulates load current despite load or input changes.

Other objects and advantages of the invention will become apparent as the following description proceeds.

To the accomplishment of the foregoing and related ends, the invention, then, comprises the features hereinafter fully dscribed and particularly pointed out in the claims, the following description and the annexed drawings setting forth in detail certain illustrative embodiments of the invention, these being indicative, however, of but a few of the various ways in which the principle of the invention may be employed.

Figure 1:
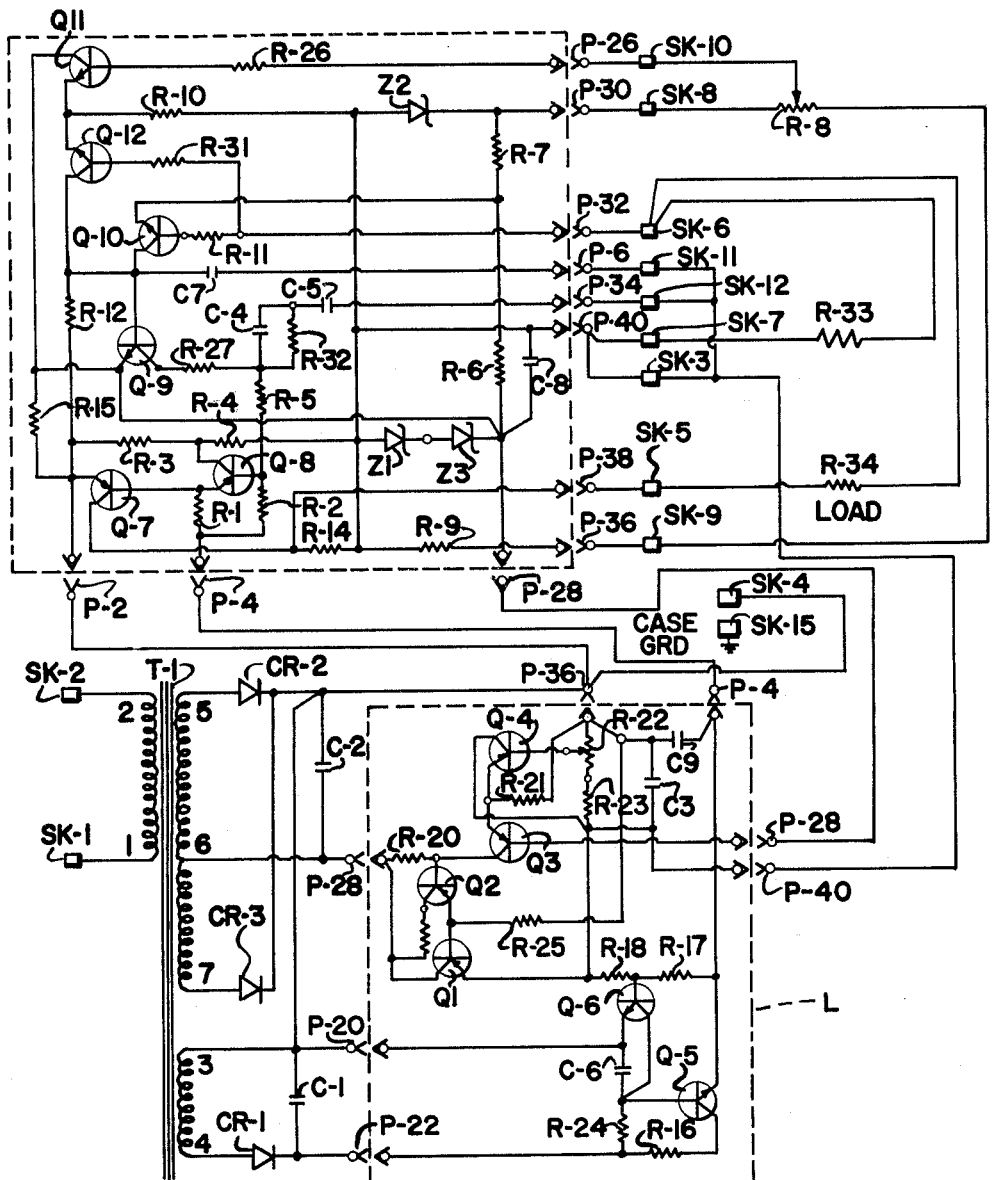
FIG. 1 is a schematic diagram of one form of the present invention.

Referring now more particularly to the drawings and first to FIG. 1 which shows a programmed precision current regulator in which the load R34 is a resistive load, the input is shown as an A.C. supply source SK–1 and SK–2, for example a 105–125 v. A.C. and 60 cycle source connected to the primary of a power transformer T1 whose center-tapped secondary provides full wave rectified D.C. at P36, P28 through suitable crystal diodes CR2 and CR3 and capacitor C2 and whose secondary 3–4 provides half-wave rectified D.C. supply at P20 and P22 through crystal diode CR1 and capacitor C1.

The basic current regulation is achieved by passing the current flowing through a component under test (the load R34), also through a program resistor R33 of known value. The program resistor R33 is selected so that it will produce a known voltage drop when the load current is at the desired value. This voltage drop is compared to an accurate voltage reference obtained from Zener diode Z2, resistors R8 and R9. Any difference between the two voltages (called an error signal) is amplified and fed back in a manner to cause the current to become the desired value. Resistor R8 is adjustable for calibration purposes.

A description of the circuit which amplifies the error signal is as follows:

Transistors Q11 and Q12 comprise a differential amplifier which compares the reference and program resistor voltages and then amplifies the difference or error signal.

The amplified error signal from the differential amplifier is applied to the base of transistor Q9 which further amplifies the error signal. The Zener diodes Z1 and Z3 in the emitter of transistor Q9 establish the voltage level of transistor Q9 emitter. These Zener diodes Z1 and Z3 are also used as a regulator voltage or reference source for other parts of the circuit, such as the Zener diode Z2. The two sources are separated by resistors R6 and R7 which absorb the difference in potential of the two voltages. The signal from transistor Q9 is further amplified by the emitter follower of transistor Q8 which drives the grounded emitter stage of transistor Q7 which is a power stage providing the desired output current for the load resistor R34. Resistors R1 and R2 are part of the bias circuit for the amplifier stages of transistors Q7 and Q8 respectively. Resistors R3 and R4 are a simple voltage divider to adjust the collector voltage for transistor Q8.

Frequency compensation networks consisting of resistors and capacitors R32, R30, C4 and C5 are used to assure stability for large load variations and changes in circuit parameters. Resistors R5 and R27 also affect stability in addition to serving as protection for transistor Q9, by limiting the collector current of transistor Q9 to a safe value during transients.

Transistor Q10 and its associated components are employed to protect the circuit from destroying itself during transients which are caused by switching the output current and load. It prevents bistable operation of the overall control circuit caused by positive feedback when large transients forward bias the collector diode of transistor Q12. Transistors Q10 and Q12 are both driven by the voltage from the program resistor R33. The emitter of transistor Q10 is at a higher potential than the emitter of transistor Q12 since the transistor Q10 emitter has the reference voltage from Zener diode Z2 plus the drop across resistor R7 applied to it. Therefore, transistor Q10 is cutoff and inactive during normal operation. However, if the program resistor voltage should become very large (due to a switching transient, for example) transistor Q10 is driven on and its collector current lowers the potential at the base of transistor Q9 which results in the output current being reduced to a normal value. As soon as the output current is reduced, the drop across program resistor R33 is reduced and transistor Q10 once again becomes cutoff and is of no consequence in the control loop. Without this circuit, the transient voltages can actually cause the collector of transistor Q12 to become forward biased and the circuit remains full on due to the resulting overall positive feedback.

Resistor R31 is used to limit transient currents into the base of transistor Q12 and resistor R26 is used to keep the differential amplifier balanced with respect to series impedance in the bases of transistors Q11 and Q12.

Over-voltage protection is achieved by accurately controlling the input voltage to the control section. The output voltage, of course, cannot exceed the input voltage. Designing the system in this manner negates the necessity of using expensive components for over-voltage protection. For excessive output transient voltages, due to breaking inductive circuits, a voltage limiting element could be added across the load.

The two voltage regulators, shown within the dashed box L, for the input power to the control section are conventional in configuration and operation and need not be described in detail.

Figure 2:
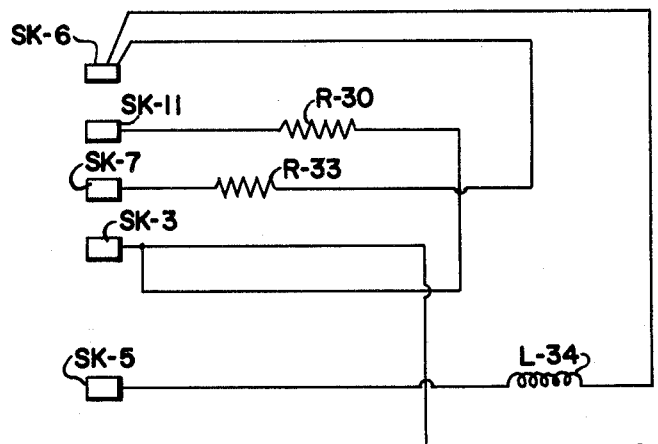
FIG. 2 is a schematic diagram of another form of the invention.

For resistive loads, R33, SK–12, SK–11 and SK–3 are strapped together as in FIG. 1. For low inductive loads L34, resistor R30 of FIG. 2 may be 0 to 300 ohms and for high inductive loads L34, resistor R30 of FIG. 2 may be 300 to 1.3K ohms.

Other applications on this basic control circuit are possible as anyone versed in the art would recognize. For example, by inserting a fixed resistor for the load resistor R–34, the program resistor R–33 could cause the regulator to work as a very accurate voltage regulator instead of a current regulator. In this case, external load would be applied across the two resistors, i.e., from SK–5 to SK–7.

Figure 3:
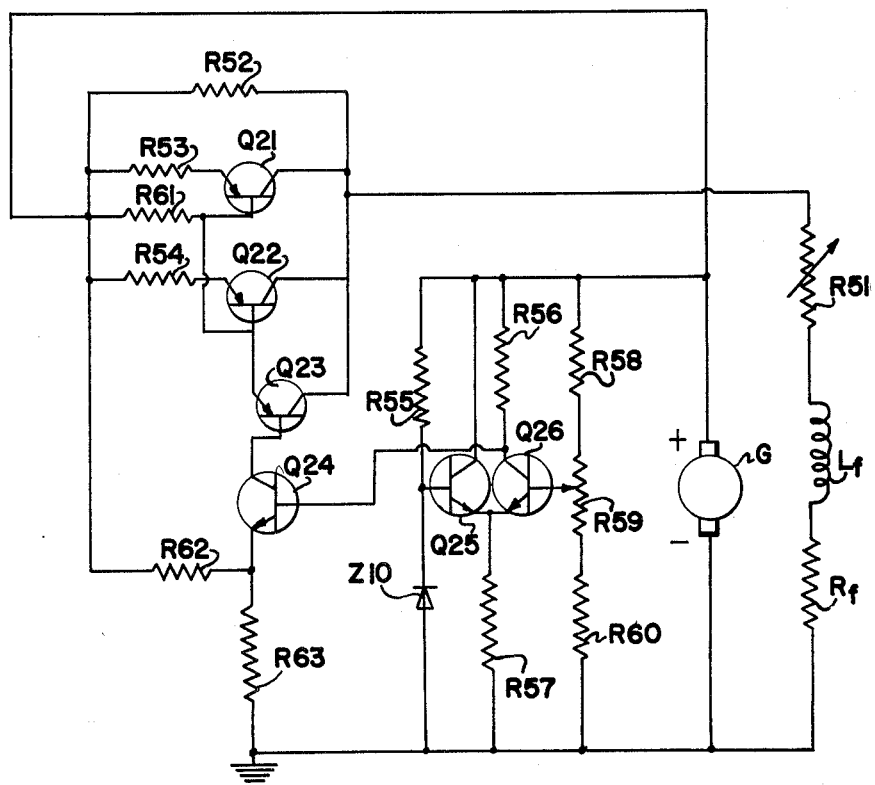
FIG. 3 is a schematic diagram of yet another form of the present invention for achieving voltage regulation of a generator.

With more particular regard now to the embodiment of FIG. 3, the direct current generator G is provided with the usual shunt field circuit comprising the inductance $Lf$ and the direct current resistance $Rf$. As shown, this field circuit includes additionally a variable resistor R51 to provide compensating adjustment for variations in the inherent resistance, which of course may vary from one generator to another.

The reference voltage for the system is provided by the Zener diode Z10, with the resistance R55 supplying the bias for the same. Resistors R58, R59 and R60 constitute a voltage divider across the generator to provide a fraction of the generator output voltage for comparison to the reference voltage provided by Z10. Transistors Q25 and Q26 here form the differential amplifier to compare the feedback or control voltage to the reference voltage and amplify the difference with resistors R56 and R57 being used for biasing of such differential amplifier.

The transistor Q24 will be seen to amplify the error signal derived from transistor Q26, with resistors R62 and R63 providing the required bias for the emitter of transistor Q24. The further transistor Q23 is connected to amplify the current from transistor Q24 and to drive the power transistors Q21 and Q22 which operate in parallel. The resistor R61 is a bias resistor, while resistors R53 and R54 serve as balancing resistors for transistors Q21 and Q22, respectively.

A resistor R52 is connected in parallel with the power transistors Q21 and Q22 in order to shunt a portion of the current and thereby reduce the power dissipation in these transistors. This feature is possible because the the generator shunt field circuit does not have to be reduced below a predetermined value.

It will accordingly be seen that if the output voltage of the generator drops, the feedback control circuit described will provide an increase in the shunt field current and consequent increase in the generator output voltage. In the event of high output voltage, the regulator circuit causes the shunt field current to decrease with a resulting decrease in the output voltage of the generator. The generator field time constant is sufficient to stablize the system, without the added stabilizing networks shown and described in the FIG. 1 embodiment.

Both embodiments accordingly operate to provide a condition responsive or control voltage and a reference voltage, with these two signals compared and the difference amplified by differential amplifier means. The error signal is thus produced in both cases and, after further amplification, applied to a power stage to provide the desired output current to the general load in the case of the FIG. 1 circuit or the more particular shunt field circuit in the FIG. 3 generator regulator embodiment.

Other modes of applying the principle of the invention may be employed, change being made as regards the details described, provided the features stated in the following claim or the equivalent of such be employed.

I, therefore, particularly point out and distinctly claim as my invention:

In a programmed precision regulator for a load circuit presenting a general impedance load, a program resistor connected in said circuit having flow therethrough of the load current, said program resistor being of selected known fixed value to produce a pre-determined control voltage when the load current is of the desired value, means for generating a reference voltage of a known order for comparison with the control voltage thus produced by the particular selected program resistor, a differential amplifier network having first and second sections, means for applying said reference voltage to the first section of said differential amplifier, means for applying said control voltage to the second section of the differential amplifier network for comparison of said reference and control voltages therein and amplification of any resulting error signal, a transient overload circuit in parallel with the second section of the differential amplifier network and including an electronic valving device, circuit means for applying a reference voltage to said electronic valving device to maintain the same at a higher bias level than said second section of the differential amplifier network, the transient protection circuit thereby being normally non-conducting and conducting in response to application of excess voltage thereto to decrease the output of the differential amplifier network, and power means connected for operation in response to the output of the differential amplifier network to provide compensating change in the output current of the load circuit to maintain the particular desired value thereof.

References Cited by the Examiner

UNITED STATES PATENTS

| | | | |
|---|---|---|---|
| 2,832,900 | 4/1958 | Ford | 317—33 |
| 2,963,637 | 12/1960 | Osborn | 323—22 |
| 2,976,475 | 3/1961 | Dodge | 323—22 |

LLOYD McCOLLUM, *Primary Examiner.*